United States Patent [19]
Sauey et al.

[11] 3,765,559
[45] Oct. 16, 1973

[54] SLUSH CONE

[75] Inventors: Lawrence K. Sauey, Baraboo; Kenneth M. Douglas, Sun Prairie; Gerald A. Rau, Baraboo, all of Wis.

[73] Assignee: Flambeau Products Corporation, of Wis.

[22] Filed: Oct. 13, 1971

[21] Appl. No.: 188,890

[52] U.S. Cl.................... 220/15, 215/13 R, 220/17
[51] Int. Cl. ........................ B65d 25/00, A47j 41/00
[58] Field of Search......................... 220/9 R, 17, 15, 220/13 R; 215/13 R; 150/.5

[56] References Cited
UNITED STATES PATENTS

| | | | |
|---|---|---|---|
| 3,476,277 | 11/1969 | Rownd................................ | 215/13 R |
| 2,863,585 | 12/1958 | Meshberg.............................. | 220/15 |
| 2,899,098 | 8/1959 | Gits........................................ | 220/17 |
| 3,365,092 | 1/1968 | Blessing................................ | 220/17 |
| 1,744,355 | 1/1930 | Benton.................................. | 220/17 |

Primary Examiner—George E. Lowrance
Assistant Examiner—Allan N. Shoap
Attorney—A. W. Molinare et al.

[57] ABSTRACT

Improvements are provided in this invention relating to a slush cone assembly. The improvements are principally related to an insulating jacket for the slush cone and means for interlocking the jacket with the slush cone. The particular interlocking means take the form of molded plastic members along the outside of the walls of the slush cone and the inside walls of the jacket together with a flexible fingers for positively biasing the plastic members of the cone against the plastic members of the jacket.

8 Claims, 6 Drawing Figures

PATENTED OCT 16 1973 3,765,559

INVENTORS
LAWRENCE K. SAUEY,
KENNETH M. DOUGLAS
BY & GERALD A. RAU

ATTORNEYS

PATENTED OCT 16 1973 3,765,559
SHEET 2 OF 2
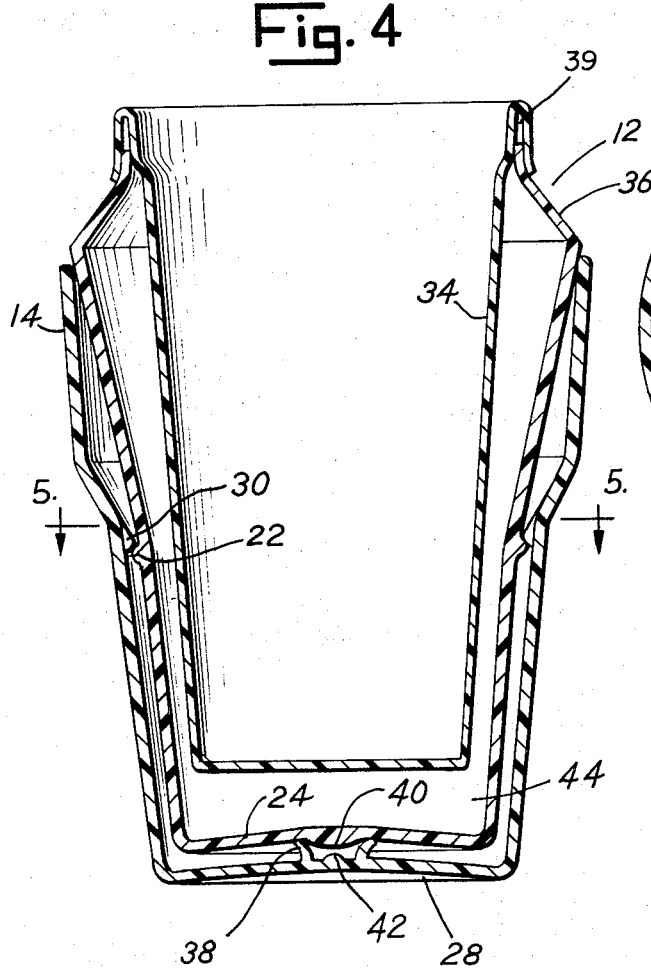
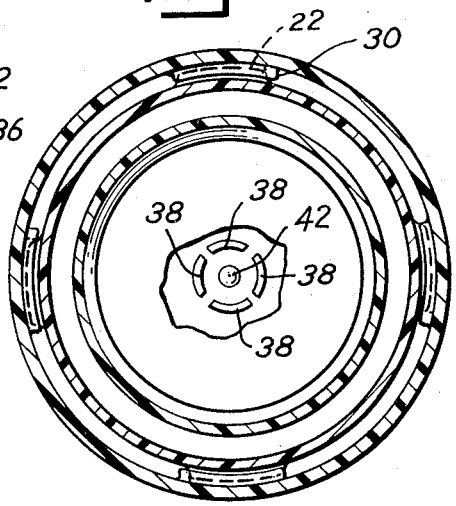
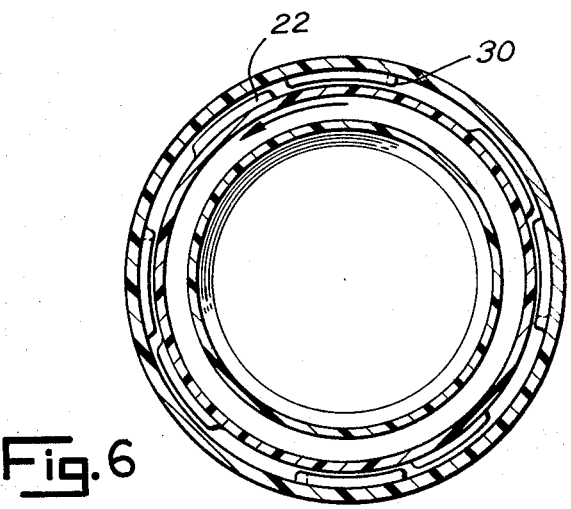
INVENTORS
LAWRENCE K. SAUEY
BY KENNETH M. DOUGLAS
& GERALD A. RAU
Molinare Allegretti,
Newitt & Witcoff
ATTORNEYS

SLUSH CONE

BACKGROUND OF THE INVENTION

The present invention is related to an improved slush cone assembly, a jacket for the same, and means for interlocking the slush cone to the jacket.

Slush mug assemblies were not unknown prior to this invention. This type of prior slush mug generally includes an inner container for receiving a beverage to be cooled. The inner container is a double walled receptacle having a cavity defined between the walls for receiving a refrigerant gel which may be chilled and frozen at temperatures commonly available in a household freezer. After the gel has been frozen, a beverage may be poured into the container and chilled therein for an extended time at ambient temperatures, and even in the hot sun. The refrigerant gel which has been frozen acts as a heat sink and absorbs heat from the beverage, often maintaining the beverage in a slush form and thus providing a delightfully cool, refreshing drink.

Because the inner container is maintained at lower than ambient temperature, it is uncomfortable for a person to hold. Accordingly, jackets have been designed in prior slush mugs to receive and insulate the inner container. However, such jackets can slip away from the inner container particularly where moisture develops along the outer walls of the container from condensation or drink spillage or other source. Accordingly, it is desirable to provide an insulating jacket for a slush cone having means for positively interlocking the cone with the insulating jacket. It is also desirable to provide such an interlocking means which may be easily and economically formed on the slush cone and jacket.

SUMMARY OF THE INVENTION

The present invention is related to an improvement in a thermoplastic container for cooling a beverage. Such a container generally includes an inner cone for receiving the beverage having inner and outer walls defining a cavity adapted to retain a refrigerant gel therebetween. The improvement of this invention includes an insulating jacket adapted to receive the cone therein together with means for positively interlocking the jacket with the inner cone when the cone is inserted into the jacket.

In a preferred embodiment, the positive interlocking means comprise a number of rigid thermoplastic members integral with and formed on the outer wall of the inner container and a corresponding plurality of rigid members integral with and formed on the inner surface of the jacket and adapted to fit over and above the horizontal members of the cone when the cone is inserted and twisted in the jacket. The improvement also includes a plurality of flexible members integral with and connected to the base of the jacket and adapted to be outwardly compressed when the cone is urged into the jacket against said members.

BRIEF DESCRIPTION OF THE DRAWINGS

There follows a brief description of the drawings showing a presenty preferred embodiment of the present invention wherein like numerals refer to like elements and wherein:

FIG. 4 is a side cross sectional view of the cone and jacket of this invention taken substantially along the lines 4—4 of FIG. 3;

FIG. 5 is an overhead cross sectional view of the slush cone and jacket of this invention taken substantially along the lines 5—5 of FIG. 4 with a portion of the base of the cone broken away to show the base of the jacket; and FIG. 6 is a cross-sectional view of FIG. 5 with the cone in the unlocked position.

DETAILED DESCRIPTION OF THE PREFERRED EMBODIMENT

Figure 1:
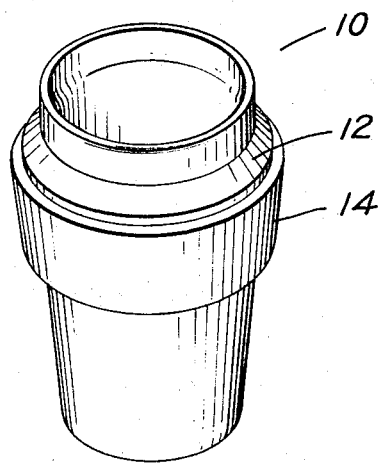
FIG. 1 is an overhead perspective view of the slush cone and jacket of the present invention.
Figure 2:
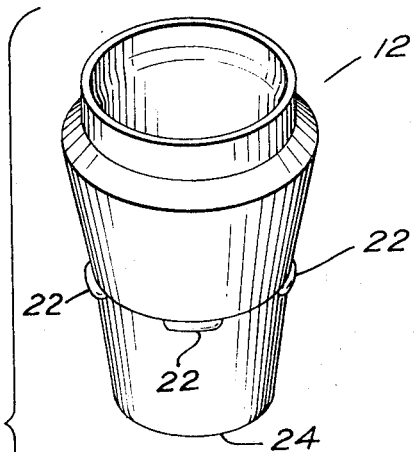
FIG. 2 is an exploded view of the slush cone separated from the jacket of this invention with a portion of the jacket broken away to show the interior thereof.
Figure 3:
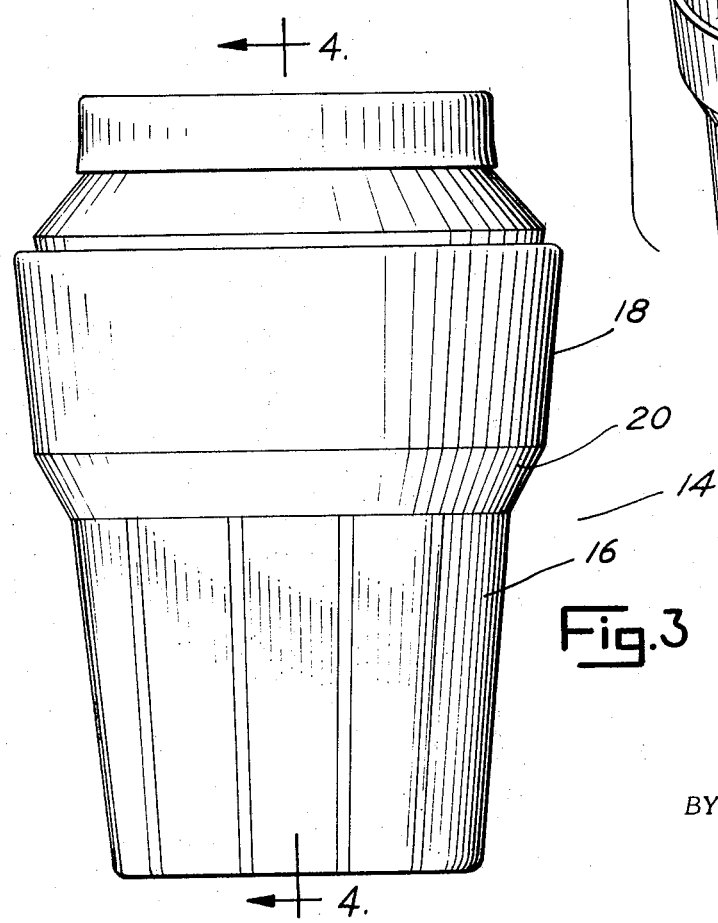
FIG. 3 is a side elevational view of the invention of FIG. 1.

Referring generally to FIGS. 1–3, there is shown a slush container 10 having an inner cone 12 housed within a jacket 14. Both the inner cone 12 and the jacket 14 are preferably formed of thermoplastic material such as polypropylene. The jacket 14 includes a lower wall 16 substantially circular in cross-sectional shape and an upper wall 18. An outwardly flared annular collar 20 is connected between the upper wall 18 and lower wall 16 of the jacket 14. The inner cone 12 includes four rigid horizontal interlocking members or projections 22 (only three of which are shown) integral with and connected to the outer wall of the cone 12. These rigid interlocking members 22 are disposed symmetrically about the outer wall of the cone 12 equidistant from the base 24 of the cone 12.

Defined on the interior of the jacket 14 are means for receiving the projections 22 taking the form of four rigid interlocking members 26 (only one of which is shown). The interlocking members 26 are defined symmetrically along the interior of the jacket 14 equidistant from the base 28 of the jacket 14. Each of the interlocking members 26 of the jacket 14 includes a horizontal member 30 and a vertical member 32 rigidly connected at the uppermost portion thereof to one end of the horizontal member 30. These interlocking members 26 are adapted to fit over and abut the projections 22 when the cone is inserted and twisted in the jacket. Referring particularly to FIG. 4, it may be seen that the inner cone 12 includes an inside wall member 34 and an outside wall member 36 connected to the inside wall member 34 at an annular joint 39 defined along the upper periphery of the walls 34 and 36. On the interior of the base 28 of the jacket 14 are molded four flexible thermoplastic fingers 38 integral with the base 28. The fingers 38 are displaced symmetrically about the center of the base 28 and are tapered upwardly therefrom and outwardly from the center of the base 280 A knob member 40 is defined integral with and connected to the center of the exterior of the base 24 of the inner cone 12. This knob 40 is adapted to cooperate with the flexible finger members 38 to bias them further outwardly when the inner cone 12 is urged downwardly within the jacket 14 and against the fingers 38. A smaller second knob 42 is defined integral with and connected to the interior of the center of the base 28 of the jacket 14. The knob 42 abuts the knob 40 to prevent undue distortion of the flexible fingers 38 when the inner core 12 is urged sufficiently downwardly within the jacket 14.

To use the slush mug of this invention, the inner cone 12 should be deposited in a low temperature location such as a common household freezer for a time sufficient to freeze the gel 44 contained between the walls 34 and 36 of the inner cone 12. After the gel 44 is frozen, the cone 12 may be removed from this location and inserted into the insulating jacket 14. As has been described, the members 22 of the cone 12 and members 26 of the jacket 14 together with the fingers 38 and knob 40 cooperate to form means for interlocking the inner cone 12 with the jacket 14. The jacket 14 and cone 12 are interlocked by inserting the cone 12 into the jacket 14 and urging it downwardly. Referring now to FIGS. 4-6, after the fingers 38 are compressed sufficiently to allow the projections 22 to be positioned just below the horizontal members 30, the inner cone 12 should be twisted clockwise until the horizontal projections 22 abut the vertical members 32. Then the cone 12 is positively interlocked with the jacket 14 with the fingers 38 biasing the projections 22 against the members 26. To release the cone from the jacket, the cone should merely be compressed and moved counterclockwise as shown in FIG. 6.

It is to be understood that the embodiment of the invention which has been described is merely illustrative of one application of the principles of the invention. Numerous modifications may be made to the disclosed embodiment without departing from the true spirit and scope of the invention.

What is claimed is:

1. In a container for cooling a beverage having an inner cone for receiving the beverage, said cone having walls defining a cavity adapted to retain a refrigerant gel therebetween, the improvement comprising, in combination:

an insulating thermoplastic jacket having a base and an upright wall connected to the base, said jacket adapted to receive said cone therein, and means for positively interlocking said cone with said jacket, wherein said positive interlocking means comprise a plurality of projections integral with the cone defined on the outer portion thereof and means for receiving said plurality of projections defined on the inner surface of said jacket and adapted to fit over and abut said projections when said cone is inserted and twisted in said jacket, and upwardly extending flexible fingers integral with the interior of the base of said jacket for contacting and upwardly biasing said cone when said cone is inserted in said jacket such that said cone may be positively secured in said jacket with said projections snugly biased against said projection receiving means.

2. The improvement as set forth in claim 1 wherein said projections comprise rigid horizontal members molded integral with said cone.

3. The improvement as set forth in claim 1 wherein said projection receiving means comprise a plurality of horizontal members molded integral with the interior of said jacket at a predetermined distance from the base of said jacket.

4. The improvement as set forth in claim 1 including stop means for preventing movement of said cone in relation to said jacket beyond a predetermined point when said projections are positively biased below and against said projection receiving means.

5. The combination as set forth in claim 4 wherein said stop means comprise a plurality of rigid vertical members molded on the interior of and integral with said jacket.

6. The improvement as set forth in claim 1 wherein said flexible fingers comprise four flexible molded thermoplastic fingers integral with and extending upwardly from the base of said jacket, and fingers displaced symmetrically about the center of said base and tapering outwardly therefrom.

7. The combination as set forth in claim 6 including a knob member connected to and integral with the exterior of the base of said cone at the center thereof and adapted to cooperate with said fingers to compress said fingers further outwardly when said cone is urged into said jacket.

8. The combination as set forth in claim 7 including a second knob member connected to and integral with the interior of the base of said jacket at the center thereof and adapted to cooperate with and abut said first knob on said cone to prevent said fingers from being unduly compressed when said cone is urged into said jacket.

* * * * *